No. 836,251. PATENTED NOV. 20, 1906.
G. HACKER.
HEATER FOR INCUBATORS.
APPLICATION FILED JULY 17, 1905.
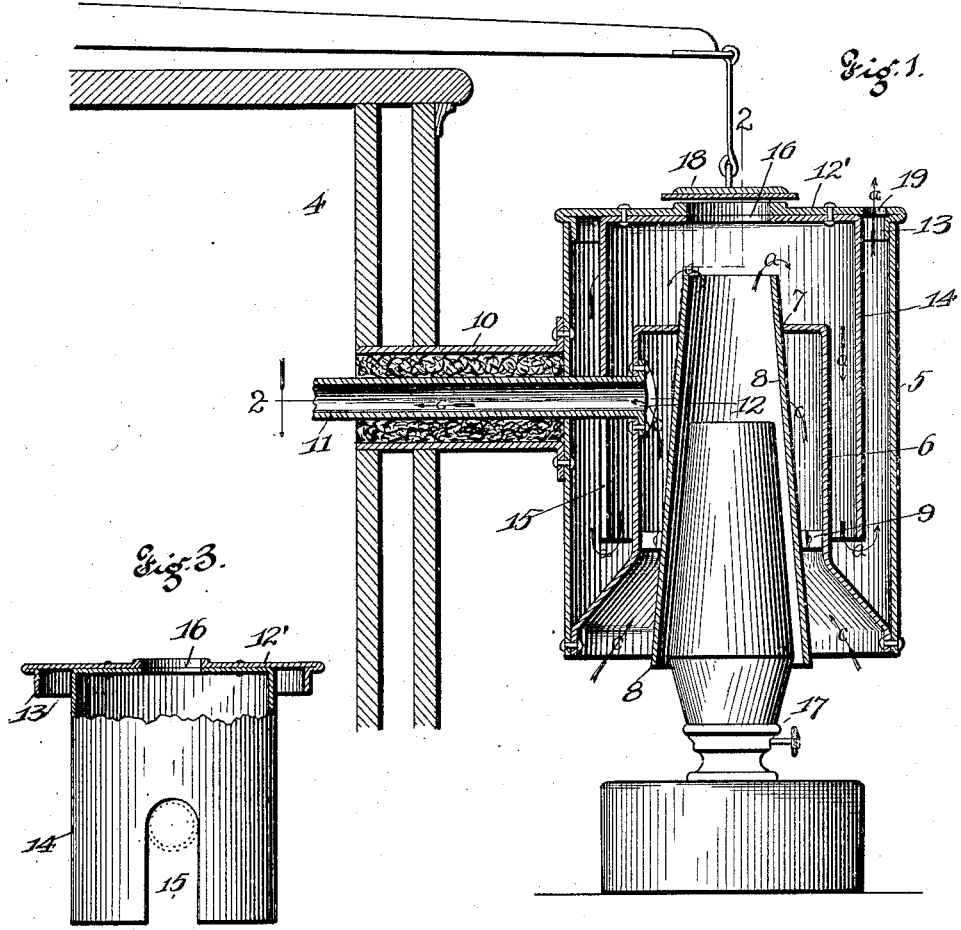
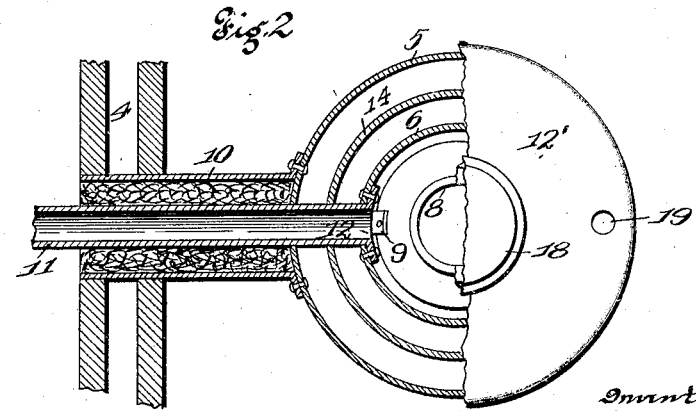
Witnesses
M. M. Brazill
L. A. L. McIntyre
Inventor
George Hacker
by Hopkins & Hicks attys a
UNITED STATES PATENT OFFICE.

GEORGE HACKER, OF ST. LOUIS, MISSOURI.

HEATER FOR INCUBATORS.

No. 836,251.         Specification of Letters Patent.         Patented Nov. 20, 1906.

Application filed July 17, 1905. Serial No. 270,164.

*To all whom it may concern:*

Be it known that I, GEORGE HACKER, a citizen of the United States, and a resident of St. Louis, Missouri, have invented certain new and useful Improvements in Heaters for Incubators, of which the following is a specification.

My invention relates to improvements in heaters for incubators; and it consists of the novel features hereinafter described and claimed.

The object of my invention is to construct a heater to be used for heating incubators, and is so constructed as to provide a perfect circulation and heating of the air admitted into the incubator and to discharge the odor and smoke which may arise from the lamp out of the heater independent of the air-passages.

A further object of my invention is to provide the heater with a removable top, whereby access may be had to the interior of the heater for cleansing the same without removing the heater proper from the incubator.

In the drawings, Figure 1 is a vertical sectional view of my complete invention shown in connection with a portion of an incubator. Fig. 2 is a top plan view with a portion in horizontal section, taken on the line 2 2 of Fig. 1. Fig. 3 is a side elevation of the cover of the heater with a portion broken away to show parts in section.

Referring to the drawings in detail, 4 indicates an incubator, to the side of which is attached my improved heater, which consists of an outer casing 5, an inner casing 6, the said casing 6 having its bottom portion flared outwardly and connected to the bottom of the outer casing 5. The upper portion of the inner casing 6 is provided with an opening 7, into which the heating-core 8 is inserted and supported within the inner casing 6 by lugs 9. The outer casing 5 is connected with the incubator by the tube 10. Through this tube 10 is passed the heating-flue 11, its end 12 being connected to the inner casing 6. The space between the tube 10 and flue 11 is suitably packed with asbestos or like material to prevent the cooling of the flue and at the same time to prevent scorching the wall of the incubator. A cover 12', having the downwardly-projecting flange 13, is located upon the outer casing 5, and from the end portion of the cover 12 is suspended a housing 14, having an elongated slot 15 formed in its one side which is to fit over the flue 11.

An opening 16 is formed in both the cover 12 and housing 14, which is to allow the heat of the lamp 17 located within the heating-cone 8 to have direct passage from the heater to the atmosphere when the valve 18 is raised by manipulation of the proper thermostat. In the cover 12 is also provided an opening 19, which is to permit the odor and smoke of the lamp to pass out without in any way passing through the incubator. The smoke and odor from the lamp will circulate in the direction indicated by the arrows *a*. This circulation will heat the outer surface of the inner casing 6 and also heat the heating-cone 8. The circulation of pure air will pass into the heater from the bottom, as indicated by the arrows *c*, passing into the inner casing, which is thoroughly heated by means of the heating-cone 8 and inner casing 6 and will then pass through the flue 11 into the incubator.

The purpose of the removable top of the heater is to permit the operator to gain access to the interior that the same may be readily and conveniently cleansed from soot which might accumulate therein.

Often a machine is made useless by smoke from the lamp passing through tubes where the operator has no access to remove the soot that collects in same.

Having thus described my invention, what I claim as new, and desire to have secured to me by the grant of Letters Patent, is—

1. A heater for incubators, comprising an outer casing, an inner casing, in combination with an incubator, a flue connecting the inner casing with the incubator, a removable flanged top located upon the outer casing, a housing extending downwardly between the inner and outer casing and secured to the flanged top, said housing forming passages for the circulation of the odor and smoke to heat the air before passing into the incubator, said inner casing being provided with means for discharging products of combustion into said passages, substantially as specified.

2. A heater for incubators, comprising a suitable casing, an inner casing, in combination with an incubator, the inner casing connected at its base to the first-mentioned casing, a removable flanged cover located on the top of the first-mentioned casing, a flue secured to the inner casing and extending into the incubator, a housing provided with a slot to fit over the flue and held in position by the flanged cover, said cover provided with an opening for the escape of the odor and smoke from the casing, a heating-cone suspended in the inner casing in which a heating device may be placed, substantially as specified.

3. A heater for incubators, comprising an outer casing and an inner casing suitably connected together at their bases, in combination with an incubator, a flue connecting the inner casing with the incubator, a removable flanged top having a housing extending downwardly between the inner and outer casings forming passages for the circulation of the smoke and odor, the cover and the housing constructed to be removed from the outer and inner casing for cleaning the interior of the heating device, and a heating-cone carried by the inner casing in which a lamp may be placed, substantially as specified.

In testimony whereof I have signed my name to this specification in presence of two subscribing witnesses.

GEORGE HACKER.

Witnesses:
ALFRED A. EICKS,
LILLY A. L. MCINTYRE.